United States Patent
Wang

(10) Patent No.: US 10,470,098 B2
(45) Date of Patent: Nov. 5, 2019

(54) SYSTEMS AND METHODS FOR IMPLEMENTING HANDOVERS IN A VEHICLE COMMUNICATION SYSTEM

(71) Applicant: Honeywell International Inc., Morris Plains, NJ (US)

(72) Inventor: Haiming Wang, Beijing (CN)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 15/812,937

(22) Filed: Nov. 14, 2017

(65) Prior Publication Data

US 2019/0150053 A1    May 16, 2019

(51) Int. Cl.
| | |
|---|---|
| *H04W 36/32* | (2009.01) |
| *H04W 36/14* | (2009.01) |
| *H04W 48/18* | (2009.01) |
| *H04L 29/08* | (2006.01) |

(52) U.S. Cl.
CPC ........... *H04W 36/32* (2013.01); *H04W 36/14* (2013.01); *H04W 48/18* (2013.01); *H04L 67/12* (2013.01)

(58) Field of Classification Search
CPC ..... H04W 36/32; H04W 88/06; H04W 36/14; H04W 48/18; H04L 67/12
See application file for complete search history.

(56) References Cited

U.S. PATENT DOCUMENTS

| | | | | |
|---|---|---|---|---|
| 6,400,690 | B1 * | 6/2002 | Liu | G01C 21/26 340/995.26 |
| 7,187,927 | B1 * | 3/2007 | Mitchell | H04W 36/12 455/431 |
| 8,094,605 | B2 * | 1/2012 | Lynch | H04B 7/18508 370/316 |
| 8,169,946 | B2 | 5/2012 | Lynch et al. | |
| 8,812,050 | B1 * | 8/2014 | Bencheikh | H04W 36/32 370/331 |

(Continued)

FOREIGN PATENT DOCUMENTS

| | | |
|---|---|---|
| CA | 2412918 | 11/2010 |
| WO | WO 2009/087026 A1 * | 7/2009 |

OTHER PUBLICATIONS

Chowdhury et al., "Handover Schemes in Satellite Networks: State-of-the-Art and Future Research Directions", IEEE Communications Surveys and Tutorials, vol. 8, No. 4, Aug. 2006, pp. 1-13.

*Primary Examiner* — Robert C Scheibel
(74) *Attorney, Agent, or Firm* — Bookoff McAndrews, PLLC

(57) ABSTRACT

A vehicle communication system is provided. The vehicle communication system includes a first communication system, a second communication system and a controller. The first communication system is configured to communicate via first type of communication signal to at least one first remote communication system. The second communication system is configured to communicate via a second type of communication signal to the at least one second remote communication system. The controller is configured to select between use of the first and second communication systems based on at least one of a predicted availability of first and second communication coverage during a travel route and an anticipated number of handovers needed in a defined window of time.

19 Claims, 7 Drawing Sheets

(56) References Cited

U.S. PATENT DOCUMENTS

| | | |
|---|---|---|
| 9,490,891 B2 | 11/2016 | Frerking et al. |
| 9,572,080 B1 | 2/2017 | Wang et al. |
| 9,577,857 B2 | 2/2017 | Lauer et al. |
| 2006/0030311 A1* | 2/2006 | Cruz ............... H01Q 1/246 455/431 |
| 2006/0128372 A1* | 6/2006 | Gazzola ............ H04W 16/18 455/424 |
| 2006/0178141 A1* | 8/2006 | McGuffin ......... G08G 5/0013 455/431 |
| 2009/0096857 A1* | 4/2009 | Frisco ............ H04B 7/18508 348/14.02 |
| 2009/0100476 A1* | 4/2009 | Frisco ............ H04B 7/18508 725/68 |
| 2016/0043796 A1 | 2/2016 | Jalali et al. |
| 2016/0205560 A1* | 7/2016 | Hyslop ............. H04W 16/14 455/454 |

\* cited by examiner

US 10,470,098 B2

SYSTEMS AND METHODS FOR IMPLEMENTING HANDOVERS IN A VEHICLE COMMUNICATION SYSTEM

BACKGROUND

In some areas more than one communication system may be available to communicate with a vehicle. For example, in an aircraft communications scenario a primary communication system is a Satellite Communication (SATCOMM) system but an Air-to-Ground (ATG) communication system may also be available. The ATG communication system may be a broadband communication system used by a mobile network company, that for example, may implement 4G, LTE, etc. technology. Communications with ATG communication systems have an advantage over communications with a SATCOMM system in that the communications are less expensive. However, ATG communication systems employ antenna systems, typically on towers and the like that have a limited communication coverage areas. Hence ATG communication systems may not be available in all locations through a vehicle travel path. Hence, all communications (especially critical communications) cannot be performed just by an ATG communication system. Systems have been employed that handover communications between different communication systems when one of the communication system is no longer available. However having to handover from one system to another can cause poor performance, may not be efficient and cost effective if the handovers have to occur in rapid fashion along a trip path.

SUMMARY

The following summary is made by way of example and not by way of limitation. It is merely provided to aid the reader in understanding some of the aspects of the subject matter described. Embodiments provide an efficient and effective vehicle handover system from one communication system to another based at least upon communication coverage and data type.

In one embodiment, a vehicle communication system is provided. The vehicle communication system includes a first communication system, a second communication system and a controller. The first communication system is configured to communicate via first type of communication signal to at a least one first remote communication system. The second communication system is configured to communicate via a second type of communication signal to the at least one second remote communication system. The controller is configured to select between use of the first and second communication systems based on at least one of a predicted availability of first and second communication coverage during a travel route and an anticipated number of handovers needed in a defined window of time.

In another example embodiment, a method of operating a vehicle communication system having a primary communication system and at least one secondary communication system is provided. The method includes determining an anticipated number of handovers between the primary communication system and the secondary communication system in defined windows of time along a vehicle path based at least in part on a communication coverage map. Determined anticipated number of handovers in each defined window of time are compared with a select threshold. The secondary communication system is activated for each defined window of time along the vehicle path where the determined anticipated number of handovers for the defined window of time is less than the select threshold.

In yet another embodiment, another method of operating a vehicle communication system that includes a primary communication system and at least one secondary communication system is provided. The method includes reviewing a communication coverage map along a projected travel path for a vehicle and determining if the at least one secondary communication system will be used as the vehicle travels along the projected travel path based on the review of the communication coverage map and at least one of a predicted percentage of time along the travel path the at least one secondary communication system may be engaged and an anticipated number of handovers needed in a defined window of time as the vehicle travels along the travel path.

BRIEF DESCRIPTION OF THE DRAWINGS

Embodiments can be more easily understood and further advantages and uses thereof will be more readily apparent, when considered in view of the detailed description and the following figures in which.

In accordance with common practice, the various described features are not drawn to scale but are drawn to emphasize specific features relevant to the subject matter described. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the embodiments, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Figure 1:
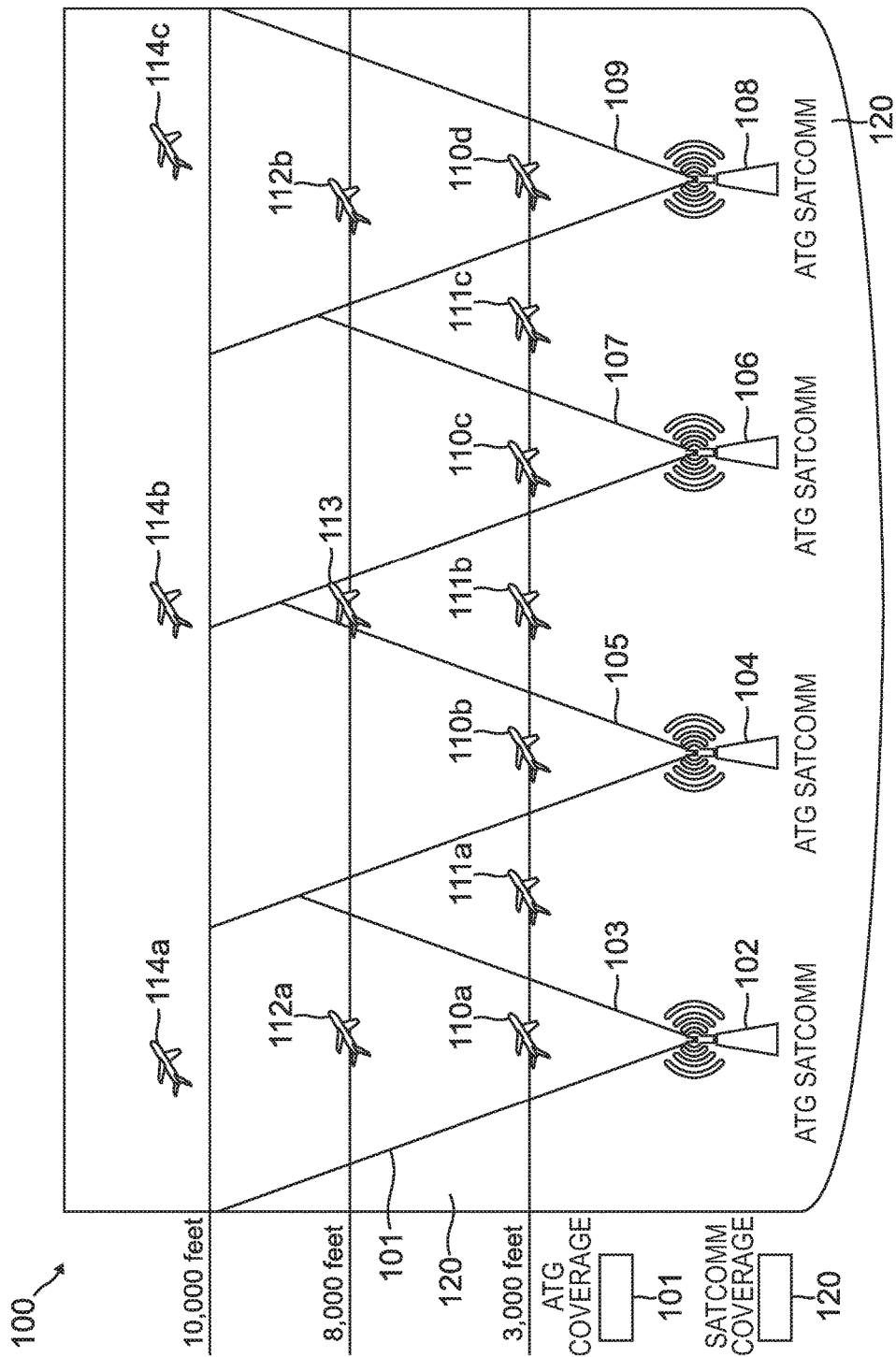
FIG. 1 is an illustration of a communication coverage map according to one exemplary embodiment.

Embodiments provide an efficient and effective vehicle handover system from one communication system to another. Referring to FIG. 1, an example communication coverage map 100 for an Air-to-Ground (ATG) communication system and Satellite Communication (SATCOMM) system is provided. In particular, FIG. 1 illustrates, the SATCOMM communication coverage 120 is available throughout the altitudes along an aircraft's travel path and the ATG communication coverage 101 is not available at some altitudes along an aircrafts' travel path. As illustrated, the ATG communication coverage 101, in this example, is formed by ATG coverage 103 from ATG station 102, ATG coverage 105 from ATG station 104, ATG coverage 107 from ATG station 106 and ATG coverage 109 from ATG station 108. This example illustrates the ATG communication coverage area 101 from each ATG station 102, 104, 106 and 108 extends out in generally a cone fashion providing generally narrow communication coverage areas near the ground while larger communication coverage areas as the altitude increase.

As the example communication coverage map 100 of FIG. 1 illustrates, an aircraft on a travel path at 3,000 feet will encounter areas along the path 110a, 110b, 110c and 110d that are in the ATG coverage 101 and areas along the path 111a, 111b and 111c that are not in the ATG coverage area 101. Hence, along a path at an altitude of 3000, a lot of handovers would be needed to take advantage of both the SATCOM SATCOMM (first or primary) and the ATG (second or secondary) communication systems.

As the example communication coverage map 100 of FIG. 1 further illustrates, an aircraft on a travel path at 8,000 feet will also encounter areas along the path 112a and 112b that are in the ATG coverage 101 and areas along the path 113 that are not in the ATG coverage area 101. Hence, as illustrated along a path at an altitude of 8000 only a few handovers would be needed to take advantage of both communication systems.

As the example communication coverage map 100 of FIG. 1 further illustrates, an aircraft on a travel path at 10,000 feet will only encounter areas along the path 114a, 114b and 114c that are all in the ATG coverage 101 areas. Hence, at an altitude of 10,000 both communication systems may be used.

Although, handovers between communication systems generally may be connected with little or no interruption in overall communication, frequent handovers may result in disconnecting signal continuity impacting the quality of the communication signal. Hence, a travel path along a 3,000 ft altitude in this example, is not suitable for a two system communication system because of too many handovers are required in a short period of time. The travel path along the 8,000 ft altitude may lend itself to a two system communication system because the number of handovers is limited along the path at this altitude. Moreover, a travel path at 10,000 ft lends itself to the use of the two communication systems since no handovers will be needed along the travel path illustrated in FIG. 1.

Embodiments determine when a handover communication system is economical and effective to implement based on the availability of communicative coverage of the communication system along a travel path of the vehicle. If the vehicle is traveling in a travel path that is continuously covered by both communication systems (such as both the ATG and SATCOMM communication systems available for an aircraft at 10,000 ft in FIG. 1), then either communication system may be used. In this scenario, the system that provides a good quality may be selected. In the aviation application vital communications may use the SATCOMM system while less critical communications may use the ATG system as further discussed below.

Figure 2:
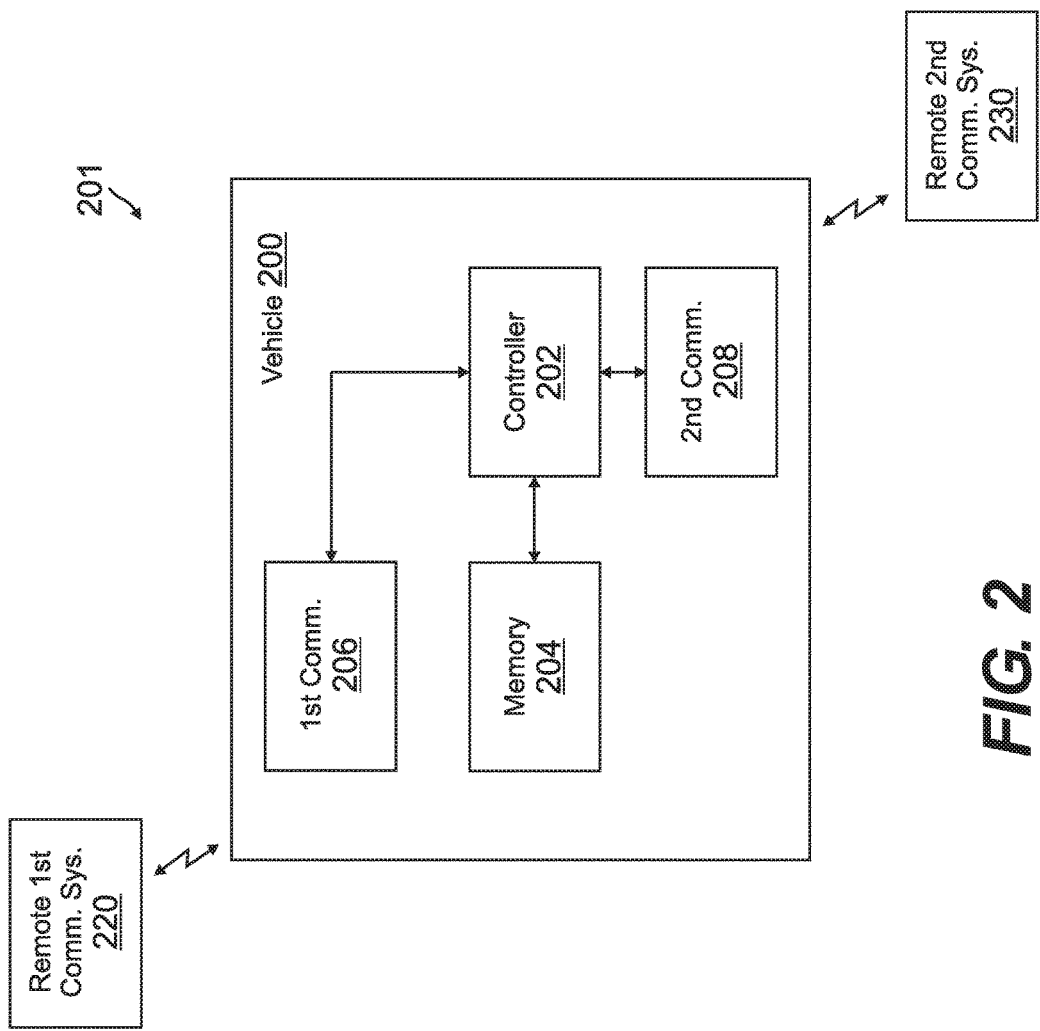
FIG. 2 is a block diagram of a communication system according to one exemplary embodiment.

Referring to FIG. 2, a block diagram of a communication system 201 of an embodiment, including a vehicle 200, a first (or primary) remote communication system 220 and a second (or secondary) remote communication system 230 is illustrated. The vehicle 200 includes a communication controller 202, a memory 204, a first (or primary) vehicle communication system 206 and a second (secondary) communication system 208. The memory is used to store communication operating instruction to be executed by the controller 202 and to store communication coverage maps. The first communication system 206 may include a receiver and transmitter or a transceiver and an antenna that are designed to communicate with the first remote communication system 220. The second communication system 208 may also include a receiver and transmitter or a transceiver and an antenna that are designed to communicate with the second remote communication system 230. In embodiments, the first and second remote communication systems 220 and 230 may be communication with each other.

In general, the controller 202 may include any one or more of a processor, microprocessor, a digital signal processor (DSP), an application specific integrated circuit (ASIC), a field program gate array (FPGA), or equivalent discrete or integrated logic circuitry. In some example embodiments, controller 202 may include multiple components, such as any combination of one or more microprocessors, one or more controllers, one or more DSPs, one or more ASICs, one or more FPGAs, as well as other discrete or integrated logic circuitry. The functions attributed to the controller 202 herein may be embodied as software, firmware, hardware or any combination thereof. The controller 202 may be part of a system controller or a component controller. The memory 204 may include computer-readable operating instructions that, when executed by the controller 202 provides communications for the vehicle. The computer readable instructions may be encoded within the memory 204. Memory 204 may comprise computer readable storage media including any volatile, nonvolatile, magnetic, optical, or electrical media, such as, but not limited to, a random access memory (RAM), read-only memory (ROM), non-volatile RAM (NVRAM), electrically-erasable programmable ROM (EEPROM), flash memory, or any other storage medium.

In the example of FIG. 2, two communication systems may be available through a travel path of a vehicle. One such communication system is associated with the first (or primary) communication system, such as, but not limited to, a SATCOMM system and the second communication (or secondary communication system) such as, but not limited to, an ATG communication system. In other embodiments, more than one secondary communication system may be available for communications.

Figure 3:
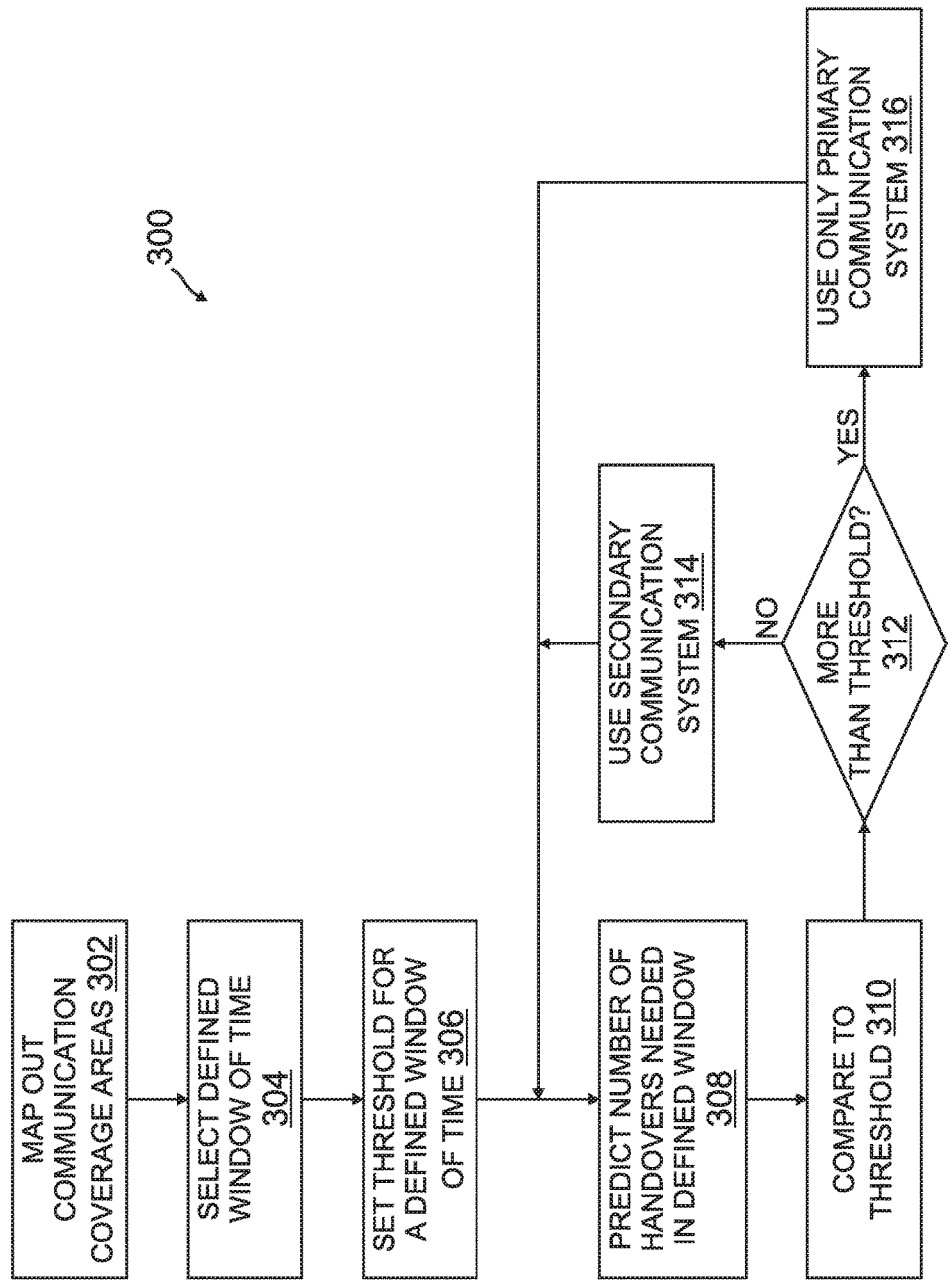
FIG. 3 is communication flow diagram according to one exemplary embodiment.

A communication flow diagram 300 of the vehicle 200 of one example embodiment is illustrated in FIG. 3. The flow diagram is provided as a series of steps or blocks. Although the blocks are provided in a sequential order for illustration purposes, they may occur in a different order. Hence, embodiments are not limited to a particular sequential order. In the example embodiment of FIG. 3, the process starts by first mapping out communication coverage areas (302). This may be done with prior vehicles mapping out communication coverage areas and proving the maps to vehicle 200 for storage in the memory 204. Mover in an embodiment, the mapping may be done with historical travel path data of vehicle 200. In yet other embodiments the maps may be created by an estimation of coverage areas based on communication system asset locations and asset communication ranges. Moreover, in still another embodiment, a network operator of a communication system may provide the coverage map. Hence, various systems and assets can be used to generate and store the coverage maps in the memory 204 of the vehicle 200.

At block (304), a defined window of time is selected. The defined window of time is a select amount of time to be reviewed as the vehicle travels along a travel path. At block (306), a threshold is set for the defined window of time. The threshold is a maximum number of the handovers within the defined window of time that is acceptable without experiencing a deterioration of communications or causing an uneconomical communication scheme. For example, a maximum number of handovers for example may be in a range or 5 to 10 in a defined window of time within a range of several minutes to tens of minutes.

At block (308), the number of handovers needed in a defined window is predicted. In an embodiment, this is done by review of the map of communication coverage areas determined at block (302). In particular, a determined distance of travel along the map at a given speed of the vehicle in the defined widow of time is calculated. Communication coverage areas and uncovered areas associated with the at least one secondary communication system is counted to determine the number of handovers between the primary communication system and the at least one communication systems will be needed. The predicted number of handovers is then compared to the threshold at block (310). If the number of handovers is below the threshold at block (312), the at least one secondary communication system may also available for use at block (314). The process then continues at block (308), predicting the number of handovers needed in the next defined window of time as the process continues.

If it is determined at block (312) that the predicted handover number is more than the threshold (or in another embodiment is at least equal to the threshold) only the primary communication system is used to communicate during the current defined window time at block (316). The system continues at block (308) predicting the number handovers needed for the next defined window time. The process continues until the vehicle has completed it trip along the vehicle path.

Figure 4:
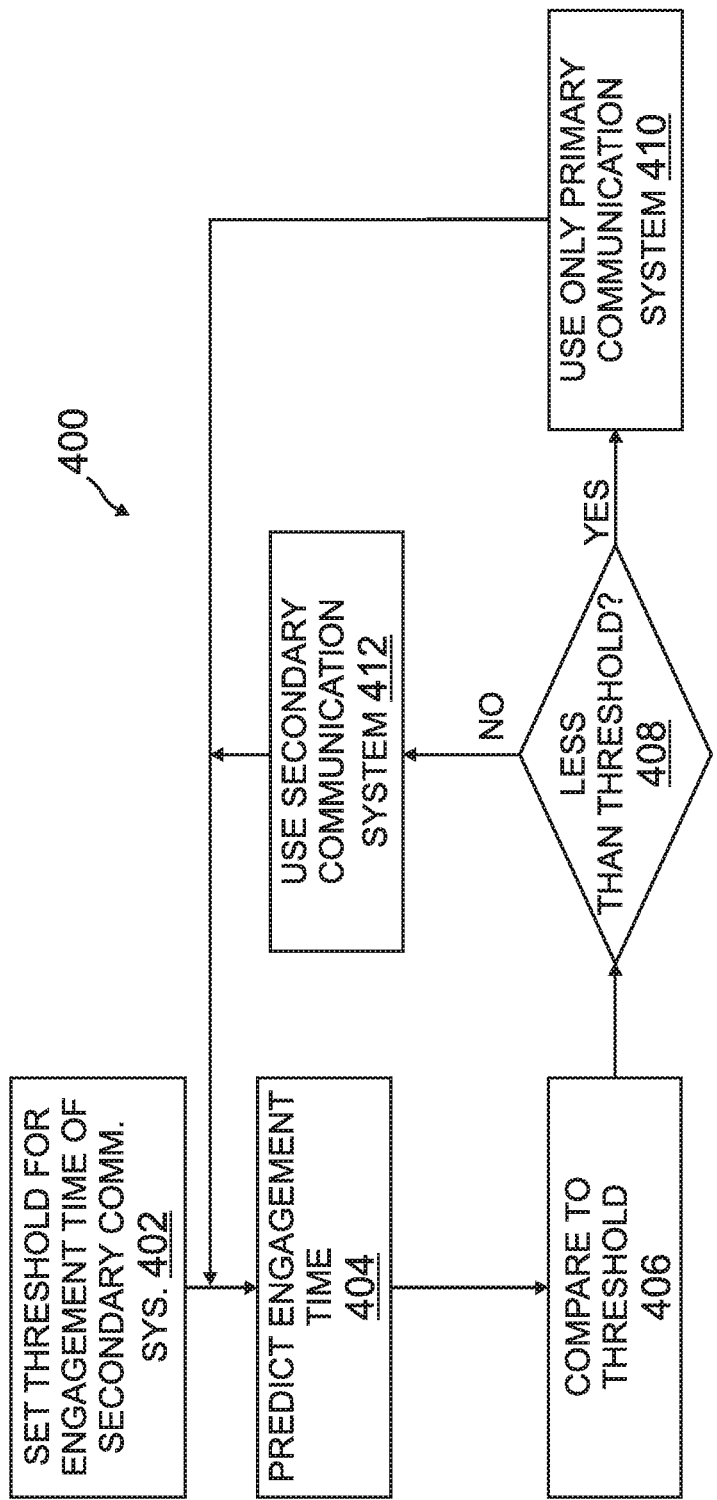
FIG. 4 is communication flow diagram according to another exemplary embodiment.

A communication flow diagram 400 of the vehicle 200 of another example embodiment is illustrated in FIG. 4. The flow diagram is provided as a series of steps or blocks. Although the blocks are provided in a sequential order for illustration purposes, they may occur in a different order. Hence, embodiments are not limited to a particular sequential order.

In this embodiment, the threshold is set for an engagement time of the secondary communication system 208 at block (402). This may be over the entire trip or over a defined section along the travel path that make up the total trip. In an embodiment the threshold is provided as a percentage. This process then predicts the engagement time of the secondary communication system 208 at block (404). This is done in an embodiment by reviewing the communication coverage map in the memory 204 along the path of travel and calculating the percentage of time the secondary communication system will be engaged. Again this can be done over the whole travel path or be broken down into sections along the travel path.

If predicted engagement time with the secondary communication system is less than the threshold at block (408), then only the primary communication system with be used at block (410). The process then ends in the embodiment where the whole travel path is used for the threshold and prediction. In the embodiment where a section of the travel path is used for both the threshold and the prediction, the process continues at block (404) until the travel path is complete.

If it is determined at block (408) that the engagement time is more than the threshold, the secondary communication system is also used along the travel path. In the embodiment where the whole path is used for the threshold and prediction the process will end at block (412). In the embodiment where a section of the travel path is used for both the threshold and the prediction, the process continues at block (404) until the travel path is complete.

Figure 5:
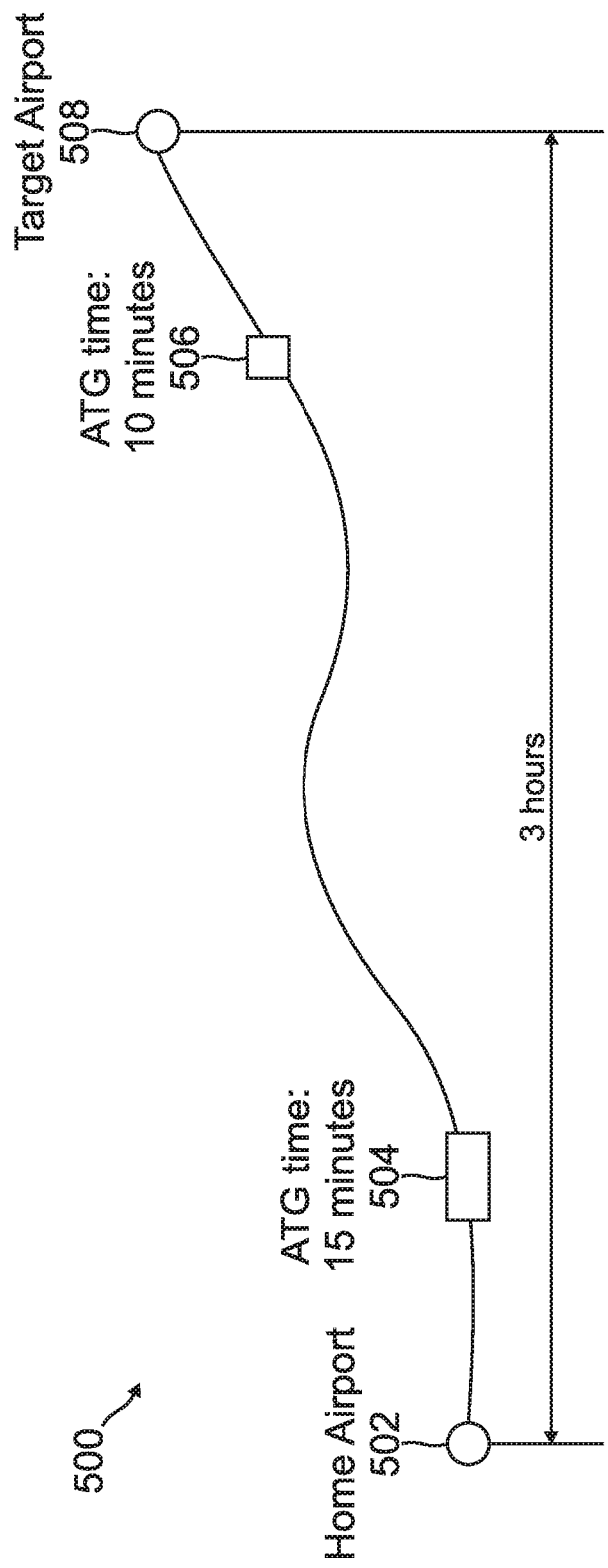
FIG. 5 illustrates an aircraft example scenario that lends itself to the application of the communication flow diagram of FIG. 4.

Referring to FIG. 5, illustrates an aircraft example scenario 500 that implements an embodiment that looks at a total predicted engagement time of a secondary communication system over a total flight path. In particular, the aircraft example scenario 500 illustrates a home airport 502 where the aircraft initiates the flight and a target airport 508 where the flight concludes. The aircraft example scenario 500 also illustrates a first time period 504 of 15 minutes along the flight path where a secondary communication system (an ATG communication system in this example) is available and a second time period 506 of ten minutes along the flight path where the secondary communication system is available. The total time of the flight is three hours. In this example, the secondary communication is available for a total of twenty five minutes (fifteen minutes plus ten minutes). Hence an engagement of the secondary communication system over the whole flight is the fraction of twenty five over one hundred and eighty minutes or 13.3 percent of the time. If the system threshold is set to 15 percent, then the secondary communication system will not be used during the flight. Hence, the primary communication system (which may be SATCOMM) will be used throughout the flight.

Figure 6:
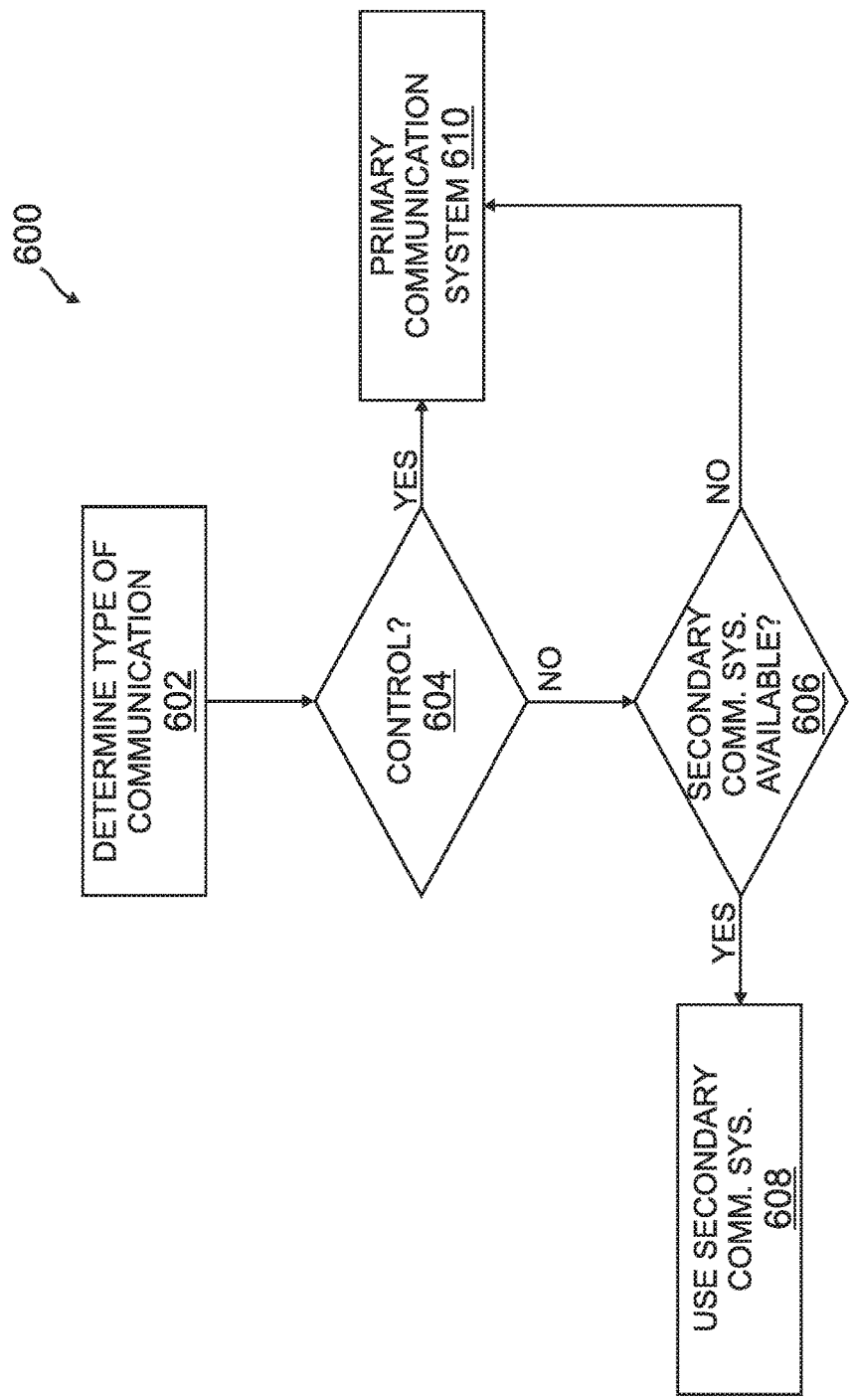
FIG. 6 is communication flow diagram according to yet another exemplary embodiment.

Another communication flow diagram 600 of the vehicle 200 of another example embodiment is illustrated in FIG. 6. The flow diagram is provided as a series of steps or blocks. Although the blocks are provided in a sequential order for illustration purposes, they may occur in a different order. Hence, embodiments are not limited to a particular sequential order. In this example embodiment, the use of a particular communication system is based on the type of communication information to be communicated. At block (602) the type of communication is determined. In this example, it is determined at block (604) if the communication signal is a control signal. A control signal, in an avionic setting is a signal needed by an avionic system in flying the aircraft. Hence it is a high priority communication. Other types of communications can be a high priority as well, such but not limited to, communications conveying inclement atmospheric conditions.

If it is determined to be a high priority communications, such as a control signal, then only the primary communication system is used at block (610) to communicate the signal in this embodiment. Generally, the primary communication system, such the SATCOMM system in the avionic system may be more reliable and may include enhanced security protocols to secure the communications. Hence, high priority communications are handled by the primary communication system in this embodiment.

If it is determined at block (604) that the communication is not high priority, or not a control signal, the process then determines if a secondary communication system is available during the flight at block (606). In one embodiment this is done by one of the processes set out above as illustrated in FIGS. 3 and 4. If it is determined that the secondary communication system is not going to be available during the flight or travel path at block (606), the primary communication system is used for communication at block (610). If it is determined at block (606) that at least one secondary communication system is available at block (606), the secondary communication system is used during the travel path at block (608). An example of communications that are not high priority communications that can be communicated over a secondary communication systems are communications that contain large amounts of less-important data transmissions. Cabin entertainment information which might include film and game information and so on is an example of not high priority communications.

Figure 7:
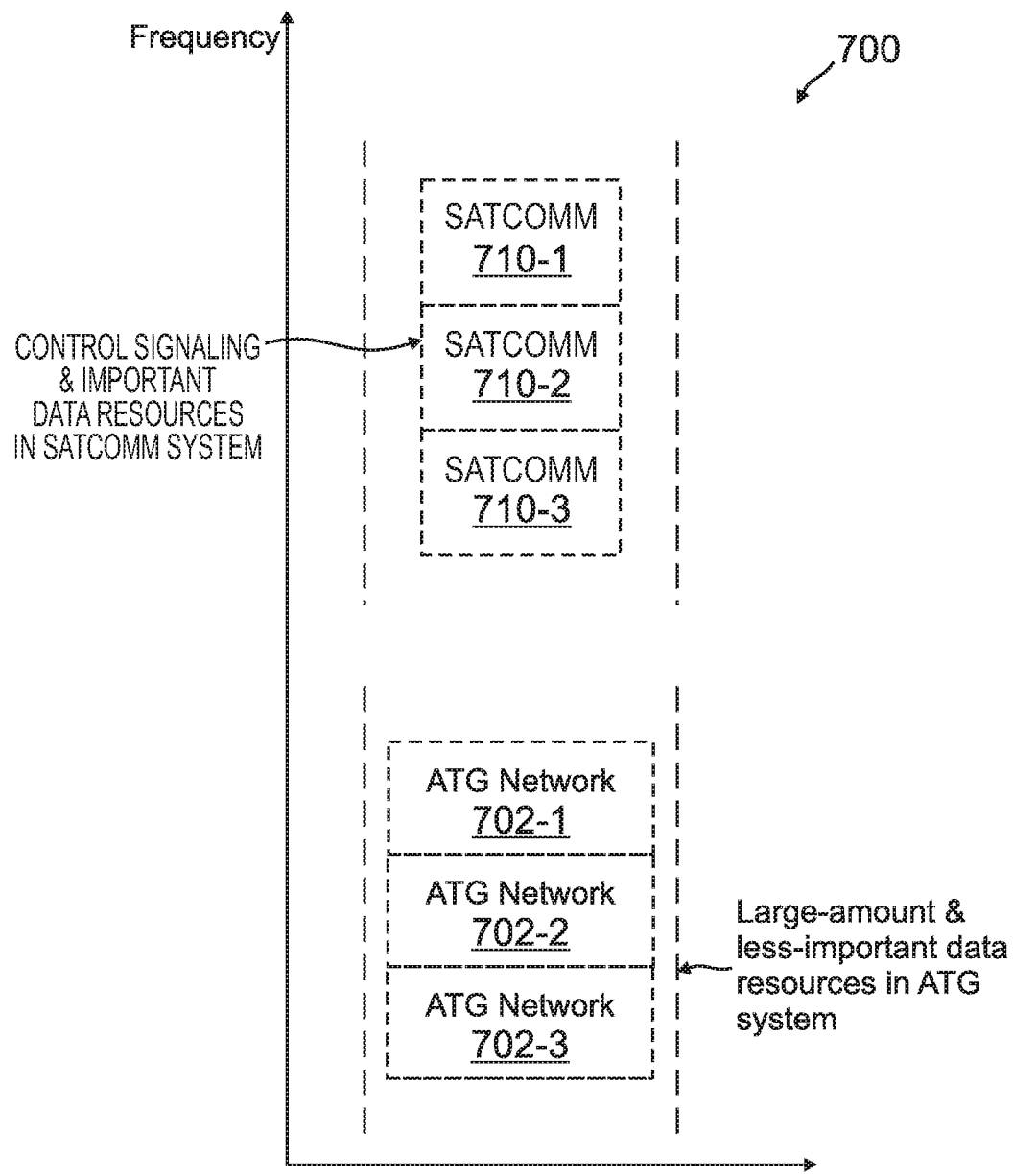
FIG. 7 is an illustration of different types of avionic data that lends itself to the application of the communication flow diagram of FIG. 6.

FIG. 7 illustrates different types of avionic data 700 needed to be communicated between a ground station and an aircraft. In particular, FIG. 7 illustrates control signaling and important data resources data 710-1, 710-2 and 710-3 to be communicated with the primary communication system, the SATCOMM system. FIG. 7 further includes a large-amount and less import data resources 702-1, 702-2 and 702-3 to be communicated with the secondary communication system, the ATG communication system, if the secondary communication system is available for communications.

Example Embodiments

Example 1 is a vehicle communication system. The vehicle communication system includes a first communication system, a second communication system and a controller. The first communication system is configured to communicate via first type of communication signal to at a least one first remote communication system. The second communication system is configured to communicate via a second type of communication signal to the at least one second remote communication system. The controller is configured to select between use of the first and second communication systems based on at least one of a predicted availability of first and second communication coverage during a travel route and an anticipated number of handovers needed in a defined window of time.

Example 2 is the vehicle communication system of Example 1, wherein the first communication system is a satellite communication system and the second communication system is an air-to-ground communication system.

Example 3 is the vehicle communication system of any of the Examples 1-2, wherein the controller is configured to not use the second communication system when the anticipated number of handovers is greater than a defined number of times in the defined window of time.

Example 4 is the vehicle communication system of any of the Examples 1-3, wherein the controller is configured to not use the second communication system when a predicted availability time of the second communication system is less than a defined availability percentage over the entire travel route.

Example 5 is the vehicle communication system of any of the Examples 1-4, wherein the controller is configured to use only one of the first and second communication systems for a select type of data communication.

Example 6 is the vehicle communication system of any of the Examples 1-5, wherein the controller is configured to determine the predicted availability of the first and second communication coverages during the travel route and the anticipated number of handovers needed in the defined window of time based at least in part on a communication coverage map.

Example 7 is the vehicle communication system of any of the Examples 1-6, wherein the controller is configured to determine the predicted availability of the first and second communication coverages along sections of the travel path.

Example 8 is a method of operating a vehicle communication system having a primary communication system and at least one secondary communication system. The method includes determining an anticipated number of handovers between the primary communication system and the secondary communication system in defined windows of time along a vehicle path based at least in part on a communication coverage map. Determined anticipated number of handovers in each defined window of time are compared with a select threshold. The secondary communication system is activated for each defined window of time along the vehicle path where the determined anticipated number of handovers for the defined window of time is less than the select threshold.

Example 9 includes the Example of claim 8, further including updating the communication coverage map as the vehicle travels along the travel path.

Example 10 includes any of the Examples 8-9, further including creating the communication coverage map during past trips along the travel path.

Example 11 includes any of the Examples 8-10, further including receiving the communication coverage map from a communication provider of the at least one secondary communication system.

Example 12 includes any of the Examples 8-11, further including using only the primary communication system with a select type of communication signal.

Example 13 includes Example 12, wherein the select type of communication signal is a control signal.

Example 14 is a method of operating a vehicle communication system that includes a primary communication system and at least one secondary communication system. The method includes reviewing a communication coverage map along a projected travel path of a vehicle and determining if the at least one secondary communication system will be used as the vehicle travels along the projected travel path based on the review of the communication coverage map and at least one of a predicted percentage of time along the travel path the at least one secondary communication system may be engaged and an anticipated number of handovers needed in a defined window of time as the vehicle travels along the travel path.

Example 15 includes the method of Example 14, further including comparing the predicted percentage of time along the travel path the at least one secondary communication system may be engaged with a select threshold in determining if the at least one secondary communication system is used as the vehicle travels along the travel path.

Example 16 includes the method of any Examples 14-15, further including comparing the anticipated number of handovers needed in a defined window of time as the vehicle travels along the travel path with a select threshold in determining if the at least one secondary communication system is used as the vehicle travels along the projected travel path.

Example 17 includes the method of any Examples 14-16, further including updating the communication coverage map as the vehicle travels along the travel path.

Example 18 includes the method of any Examples 14-17, further including creating the communication coverage map from past vehicle trips.

Example 19 includes the method of any Examples 14-18, further including receiving at least a portion of the communication coverage map from a remote source.

Example 20 includes the method of any Examples 14-19, further including using only the primary communication system to communicate messages of a select type.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A vehicle communication system comprising:
    a first communication system configured to communicate via first type of communication signal to at least one first remote communication system;
    a second communication system configured to communicate via a second type of communication signal to at least one second remote communication system;
    a controller located in a vehicle, configured to perform the following:
    review a communication coverage map along a projected travel path of the vehicle;
    assign a priority level to communication associated with the vehicle;
    select between use of the first and second communication systems based on the priority level of the communication, a predicted percentage of time along the travel path with first or second communication system coverage, and an anticipated number of handovers between the first communication system and second communication system needed in a defined window of time; and
    activate the selected communication system as the vehicle travels along the projected travel path.

2. The vehicle communication system of claim 1, wherein the first communication system is a satellite communication system and the second communication system is an air-to-ground communication system.

3. The vehicle communication system of claim 1, wherein the controller is configured to not use the second communication system when the anticipated number of handovers is greater than a defined number of times in the defined window of time.

4. The vehicle communication system of claim 1, wherein the controller is configured to not use the second communication system when a predicted availability time of the second communication system is less than a defined availability percentage over the entire travel route.

5. The vehicle communication system of claim 1, wherein the controller is configured to use only one of the first and second communication systems for a select type of data communication.

6. The vehicle of claim 1, wherein the controller is configured to determine the predicted availability of the first and second communication coverages during the travel route and the anticipated number of handovers needed in the defined window of time based at least in part on a communication coverage map.

7. The vehicle of claim 1, wherein the controller is configured to determine the predicted availability of the first and second communication coverage along sections of the travel path.

8. A method of operating a vehicle communication system having a first communication system and at least one second communication system, the method comprising:
    reviewing a communication coverage map along a projected travel path for the vehicle;
    assigning a priority level to communication associated with the vehicle;
    determining an anticipated number of handovers between the first communication system and the second communication system in defined windows of time along the projected vehicle path based at least in part on the communication coverage map;
    comparing determined anticipated number of handovers in each defined window of time with a select threshold;
    activating the second communication system for each defined window of time along the vehicle path based on the priority level of the communication, a predicted percentage of time along the travel path with first communication system coverage or second communication system coverage, and whether the determined anticipated number of handovers for the defined window of time is less than the select threshold; and
    activating the first communication system for each defined window of time along the vehicle path based on the priority level of the communication, a predicted percentage of time along the travel path with first communication system coverage or second communication system coverage, and whether the determined anticipated number of handovers for the defined window of time is more than the select threshold.

9. The method of claim 8, further comprising:
    updating the communication coverage map as the vehicle travels along the travel path.

10. The method of claim 8, further comprising:
    creating the communication coverage map during past trips along the travel path.

11. The method of claim 8, further comprising:
    receiving the communication coverage map from a communication provider of the second communications.

12. The method of claim 8, further comprising:
    using only the first communication system with a select type of communication signal.

13. The method of claim 12, wherein the select type of communication signal is a control signal.

14. A method of operating a vehicle communication system that includes a first communication system and at least one second communication system, the method comprising:
    reviewing a communication coverage map along a projected travel path for a vehicle;
    assigning a priority level to communication associated with the vehicle;
    determining if the at least one first or second communication system will be used as the vehicle travels along the projected travel path based on the priority level of the communication, a predicted percentage of time along the travel path with the first or second communication coverage, and an anticipated number of handovers between the first communication system and second communication system needed in a defined window of time as the vehicle travels along the travel path; and
    activating the first or second communication system as the vehicle travels along the projected travel path based on the determining result.

15. The method of claim 14, further comprising:
    comparing the anticipated number of handovers needed in a defined window of time as the vehicle travels along the travel path with a select threshold in determining if the at least one second communication system is used as the vehicle travels along the projected travel path.

16. The method of claim 14, further comprising:
    updating the communication coverage map as the vehicle travels along the travel path.

17. The method of claim 14, further comprising:
    creating the communication coverage map from past vehicle trips.

18. The method of claim 14, further comprising:
receiving at least a portion of the communication coverage map from a remote source.

19. The method of claim 14, further comprising:
using only the first communication system to communicate messages of a select type.

* * * * *